Jan. 22, 1952  J. HANZLIK  2,583,214
WEEDING TOOL
Filed June 7, 1949
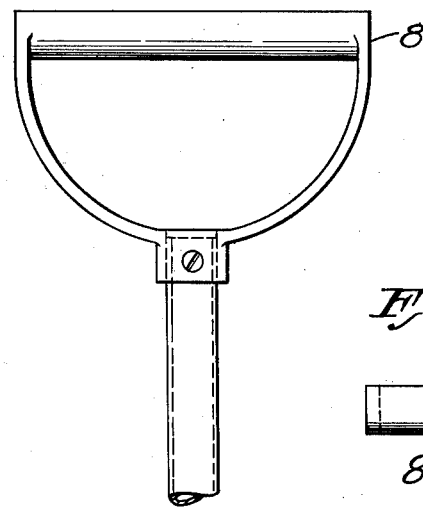
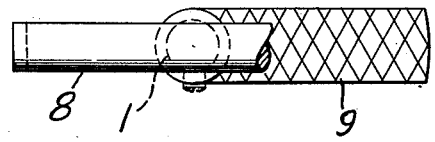
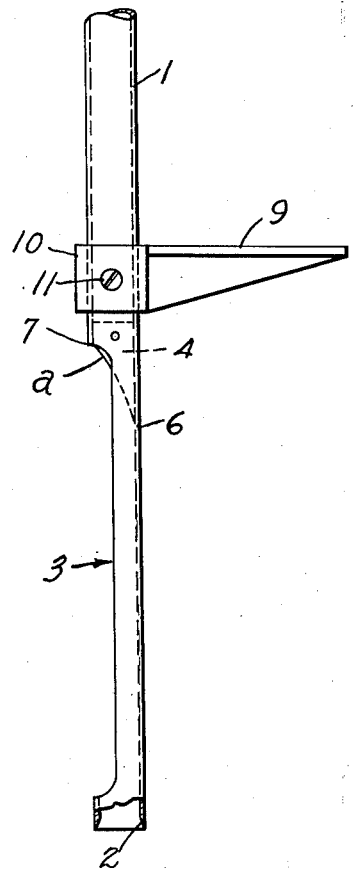
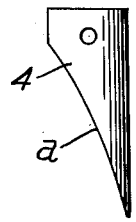
JAMES HANZLIK,
INVENTOR.
BY
ATTORNEY.

Patented Jan. 22, 1952

2,583,214

UNITED STATES PATENT OFFICE 2,583,214

WEEDING TOOL

James Hanzlik, Gardena, Calif.

Application June 7, 1949, Serial No. 97,583

1 Claim. (Cl. 294—50.7)

This invention relates to a weeding tool and it is primarily an object of the invention to provide a tool of this kind especially designed for use in the removal of dandelions and other weeds and plants having deep slender roots.

It is also an object of the invention to provide a tool of this kind including a tubular ground penetrating means together with means for forcing the member into the ground by manual or pedal pressure or both.

The invention consists in the details of construction and in the combination and arrangement of the several parts of my weeding tool whereby certain advantages are attained, as will be hereinafter more fully set forth.

In order that my invention may be better understood, I will now proceed to describe the same with reference to the accompanying drawings, wherein:

Figure 1, is a view in elevation, with portions broken away, of a weeding tool constructed in accordance with an embodiment of the invention;

Figure 2, is a view in top plan with a part broken away; and

Figure 3, is an elevational view of the plug herein employed unapplied.

In the embodiment of the invention as illustrated in the accompanying drawings, 1 denotes an elongated tubular member of desired dimensions having its outer or working end open with the defining wall for said open end sharpened, as at 2, to facilitate penetration of the ground.

The outer or working end portion of the member 1 inwardly spaced from but in close proximity to the sharpened open end has its wall cut away, as at 3. This cut away portion 3 is of material length and extends substantially half way around the member 1.

Fitted into the member 1 at the top or inner extremity of the cut out portion 3 is a plug 4, the outer face a of which being on an angle to provide an inclined plane from the rear transverse center 6 of the cut out portion 3 to the central top or inner margin 7 of the cut out portion 3.

The top or upper extremity of the member 1 has fixed thereto a hand grip 8 and extending laterally from the member 1 and preferably at a point closely adjacent to the cut portion 3 but inwardly thereof is a foot rest 9.

The foot rest 9 includes a sleeve 10 through which the member 1 is snugly inserted and said sleeve or collar 10 carries a binding screw 11 for securing the foot rest 9 in a selected position along the member 1.

In practice, the member 1 is placed over the plant to be removed and then forced down into the ground by pressure of the hand grip 8 or foot rest 9 or both. The member 1 is of a length outwardly or below the plug 4 to penetrate the ground sufficiently to assure removal of the plant and its roots when the tool is lifted out of the ground by pull on the hand grip 8. This is especially true in the removal of dandelions or other plants having deep slender roots. When the tool is removed a core of earth with the plant roots is retained in the member 1.

It is not necessary to remove the earth core from the top for the next or succeeding operation as when the tool is again used the core contained therein will be forced upwardly or inwardly with respect to the member 1 and as a result of contact with the inclined face a of the plug 4 will be ejected through the opening 3.

While the device has been primarily set forth as a weeding tool yet it can be employed with equal advantage in transferring plants and grasses, especially "discondra." It is thought to be readily obvious that by removing a core from the lawn and then using the tool a core containing desired plants such as discondra from a flat of discondra, this last named core can be neatly fitted in the hole previously made with the same tool.

From the foregoing description it is thought to be obvious that a weeding tool constructed in accordance with my invention is particularly well adapted for use by reason of the convenience and facility with which it may be assembled and operated.

I claim:

In a weeding tool, an elongated tubular member having its lower end open and a slotted cutout extending upwardly a substantial distance from adjacent said lower end, a hand grip at the upper end of said member, a foot rest adjustably mounted on and projecting laterally from said member above the upper end of said cutout, the edge of the open end of said member being sharpened to facilitate ground penetration, and a plug secured in said member at the upper end of said cutout and having its lower end portion exposed through the latter and provided with an obliquely angled surface to divert a dirt slug outwardly of said cutout.

JAMES HANZLIK.

REFERENCES CITED

The following references are of record in the file of this patent:

UNITED STATES PATENTS

| Number | Name | Date |
| --- | --- | --- |
| 466,207 | Wells | Dec. 29, 1891 |
| 828,452 | Barry | Aug. 14, 1906 |
| 1,952,585 | Croasdale, Jr., et al. | Mar. 27, 1934 |
| 2,282,673 | Peterson | May 12, 1942 |

FOREIGN PATENTS

| Number | Country | Date |
| --- | --- | --- |
| 15,535 | Great Britain | July 14, 1903 |